United States Patent
Kwon et al.

(10) Patent No.: US 9,715,639 B2
(45) Date of Patent: Jul. 25, 2017

(54) METHOD AND APPARATUS FOR DETECTING TARGETS

(71) Applicant: The Boeing Company, Chicago, IL (US)

(72) Inventors: Hyukseong Kwon, Oak Park, CA (US); Kyungnam Kim, Oak Park, CA (US); Yuri Owechko, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 125 days.

(21) Appl. No.: 14/743,297

(22) Filed: Jun. 18, 2015

(65) Prior Publication Data

US 2016/0371850 A1 Dec. 22, 2016

(51) Int. Cl.
| G06K 9/00 | (2006.01) |
|---|---|
| G06K 9/62 | (2006.01) |
| G06K 9/32 | (2006.01) |
| G06K 9/46 | (2006.01) |

(Continued)

(52) U.S. Cl.
CPC ......... *G06K 9/6202* (2013.01); *G06K 9/3241* (2013.01); *G06K 9/4647* (2013.01); *G06K 9/6212* (2013.01); *G06K 9/6215* (2013.01); *G06K 9/6267* (2013.01); *G06K 9/72* (2013.01); *G06T 7/248* (2017.01); *G06K 2009/6213* (2013.01); *G06K 2209/21* (2013.01); *G06T 2207/20072* (2013.01);

(Continued)

(58) Field of Classification Search
CPC ........... G06T 7/204; G06T 2207/20072; G06T 2207/20076; G06T 2207/30241; G06T 2207/30248; G06K 9/6202; G06K 9/6212; G06K 9/6215; G06K 9/6267; G06K 2009/6213

See application file for complete search history.

(56) References Cited

U.S. PATENT DOCUMENTS

| 6,704,466 B1 | 3/2004 | Yamamoto et al. |
| 7,545,967 B1 | 6/2009 | Prince et al. |
| 8,131,786 B1 | 3/2012 | Bengio et al. |

(Continued)

FOREIGN PATENT DOCUMENTS

| CN | 104715249 A | 6/2015 |
| EP | 2575079 A2 | 4/2013 |

(Continued)

OTHER PUBLICATIONS

Arth et al., "Object Reacquisition and Tracking in Large-Scale Smart Camera Networks," IEEE International Conference on Distributed Smart Cameras, Sep. 2007, pp. 156-163.

(Continued)

*Primary Examiner* — Shefali Goradia
(74) *Attorney, Agent, or Firm* — Yee & Associates, P.C.

(57) ABSTRACT

A method and apparatus for performing target detection. A potential object is detected within a candidate chip in an image. The potential object is verified as a candidate object. The candidate object is classified as one of a candidate target or a background in response to the potential object being verified as the candidate object. The candidate target is verified as a target of interest in response to the candidate object being classified as the candidate target.

17 Claims, 13 Drawing Sheets

(51) Int. Cl.
*G06K 9/72* (2006.01)
*G06T 7/246* (2017.01)

(52) U.S. Cl.
CPC .............. *G06T 2207/20076* (2013.01); *G06T 2207/30241* (2013.01); *G06T 2207/30248* (2013.01)

(56) References Cited

U.S. PATENT DOCUMENTS

| | | | |
|---|---|---|---|
| 8,615,105 | B1 | 12/2013 | Cheng et al. |
| 9,036,910 | B1 | 5/2015 | Mundhenk et al. |
| 9,299,001 | B2* | 3/2016 | Litvin .................. G01V 5/0008 |
| 2001/0028732 | A1 | 10/2001 | Coulombe et al. |
| 2006/0002615 | A1 | 1/2006 | Fu et al. |
| 2006/0204109 | A1 | 9/2006 | Michelsson et al. |
| 2008/0187234 | A1 | 8/2008 | Watanabe et al. |
| 2008/0199045 | A1 | 8/2008 | Ekin |
| 2008/0205755 | A1* | 8/2008 | Jackson ............... G06K 9/6212 382/168 |
| 2009/0297048 | A1* | 12/2009 | Slotine ................. G06K 9/4671 382/224 |
| 2010/0092036 | A1 | 4/2010 | Das et al. |
| 2011/0274342 | A1 | 11/2011 | Maeda et al. |
| 2013/0016889 | A1 | 1/2013 | Myronenko et al. |
| 2014/0072217 | A1 | 3/2014 | Xu et al. |
| 2015/0131851 | A1 | 5/2015 | Bernal et al. |
| 2015/0169956 | A1 | 6/2015 | You et al. |
| 2016/0371530 | A1 | 12/2016 | Kwon et al. |

FOREIGN PATENT DOCUMENTS

| | | |
|---|---|---|
| EP | 2575104 A1 | 4/2013 |
| WO | WO2008057451 A2 | 5/2008 |

OTHER PUBLICATIONS

Mundhenk et al., "Detection of unknown targets from aerial camera and extraction of simple object fingerprints for the purpose of target reacquisition," Intelligent Robots and Computer Vision XXIX: Algorithms and Techniques, SPIE vol. 8301, Jan. 2012, 14 pages.
Mei et al., "Robust Visual Tracking and Vehicle Classification via Sparse Representation," IEEE Transactions on Pattern Analysis and Machine Intelligence, vol. 33, Issue 11, Apr. 2011, pp. 2259-2272.
Khosla et al., "A Neuromorphic System for Object Detection and Classification," Signal Processing, Sensor Fusion, and Target Recognition XXII, SPIE vol. 8745, May 2013, 8 pages.
Kullback et al., "On Information and Sufficiency," The Annals of Mathematical Statistics, vol. 22, No. 1, Mar. 1951, pp. 79-86.
Hui, "VIVID Tracking Evaluation Web Site," The Robotics Institute, Carnegie Mellon University—School of Computer Science, copyright 2005, 2 pages, accessed Jun. 2, 2015. http://vision.cse.psu.edu/data/vividEval/datasets/datasets.html.
Poynton, "Digital Video and HDTV: Algorithms and Interfaces," Morgan Kaufmann Publishers, copyright 2003, Chapter 24: Luma and Color Differences, pp. 284-285.
Dalal et al., "Histograms of Oriented Gradients for Human Detection," IEEE Computer Society Conference on Computer Vision and Pattern Recognition, vol. 1, Jun. 2005, pp. 886-893.
Mundhenk et al., "Method and System for Using Fingerprints to Track Moving Objects in Video," U.S. Appl. No. 13/631,726, filed Sep. 28, 2012, 60 pages.
Guo et al., "Vehicle Fingerprinting for Reacquisition & Tracking in Videos," IEEE Computer Society Conference on Computer Vision and Pattern Recognition, vol. 2, Jun. 2005, pp. 761-768.
Ibrahim et al., "Visible and IR Data Fusion Technique Using the Contourlet Transform," International Conference on Computational Science and Engineering, Aug. 2009, vol. 2, pp. 42-47.
Waxman et al., "Fused EO/IR Detection & Tracking of Surface Targets: Flight Demonstrations," International Conference on Information Fusion, Jul. 2009, pp. 1439-1443.
Kim et al., "Bio-Inspired Algorithms for Target Detection and Classification in Airborne Videos," Association for Unmanned Vehicle Systems International, copyright 2012, 11 pages.
Cheng et al., "Vehicle Detection in Aerial Surveillance Using Dynamic Bayesian Networks," IEEE Transactions on Image Processing, vol. 21, No. 4, Apr. 2012, pp. 2152-2159.
Patel et al., "Automatic Target Recognition Based on Simultaneous Sparse Representation," IEEE International Conference on Image Processing, Sep. 2010, pp. 1377-1380.
Eikvil et al., "Classification-based vehicle detection in high-resolution satellite images," ISPRS Journal of Photogrammetry and Remote Sensing, vol. 64, Issue 1, Jan. 2009, pp. 65-72.
Nguyen et al., "On-line Boosting for Car Detection from Aerial Images," International IEEE Conference on Computer Sciences, Mar. 2007, pp. 87-95.
Welch, "The Generalization of 'Student's' Problem when Several Different Population Variances are Involved," Biometrika Trust, vol. 34, No. ½, Jan. 1947, pp. 28-35.
Leitloff et al., "Vehicle Detection in Very High Resolution Satellite Images of City Areas," IEEE Transactions on Geoscience and Remote Sensing, vol. 48, No. 7, Jul. 2010, pp. 2795-2806.
Kembhavi et al., "Vehicle Detection Using Partial Least Squares," IEEE Transactions on Pattern Analysis and Machine Intelligence, vol. 33, No. 6, Jun. 2011, pp. 1250-1265.
Xiao et al., "Vehicle Detection and Tracking in Wide Field-of-View Aerial Video," IEEE Conference on Computer Vision and Pattern Recognition, Jun. 2010, pp. 679-684.
Paravati et al., "A Genetic Algorithm for Target Tracking in FLIR Video Sequences Using Intensity Variation Function," IEEE Transactions on Instrumentation and Measurement, vol. 58, No. 10, Oct. 2009, pp. 3457-3467.
Kwon et al., "Method and Apparatus for Tracking Targets," U.S. Appl. No. 14/743,349, filed Jun. 18, 2015, 57 pages.
Extended European Search Report, dated Nov. 7, 2016, regarding Application No. EP16175212.6, 14 pages.
Extended European Search Report, dated Nov. 22, 2016, regarding Application No. EP16175214.2, 9 pages.
Goto et al., "CS-HOG: Color Similarity-based HOG," 19th Korea-Japan Joint Workshop on Frontiers of Computer Vision (FCV), Jan. 2013, pp. 266-271.
Yang et al., "Multi-Class Moving Target Detection with Gaussian Mixture Part Based Model," 2014 IEEE International Oonference on Consumer Electronics (ICCE), Jan. 2014, pp. 386-387.
Office Action, dated Jan. 17, 2017, regarding U.S. Appl. No. 14/743,349, 23 pages.
Notice of Allowance, dated Apr. 19, 2017, regarding U.S. Appl. No. 14/743,349, 19 pages.

\* cited by examiner

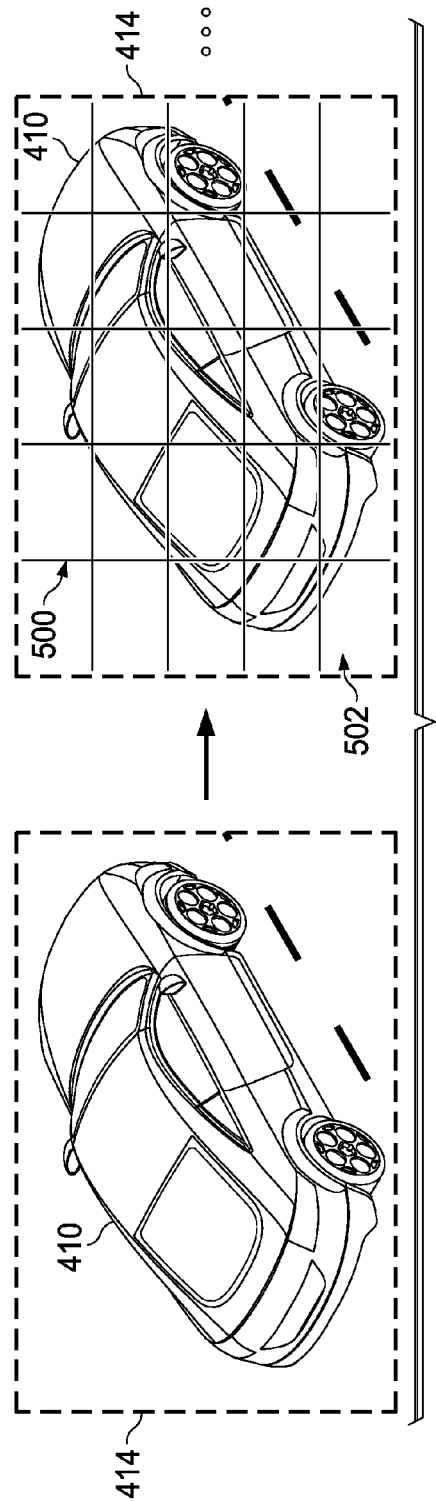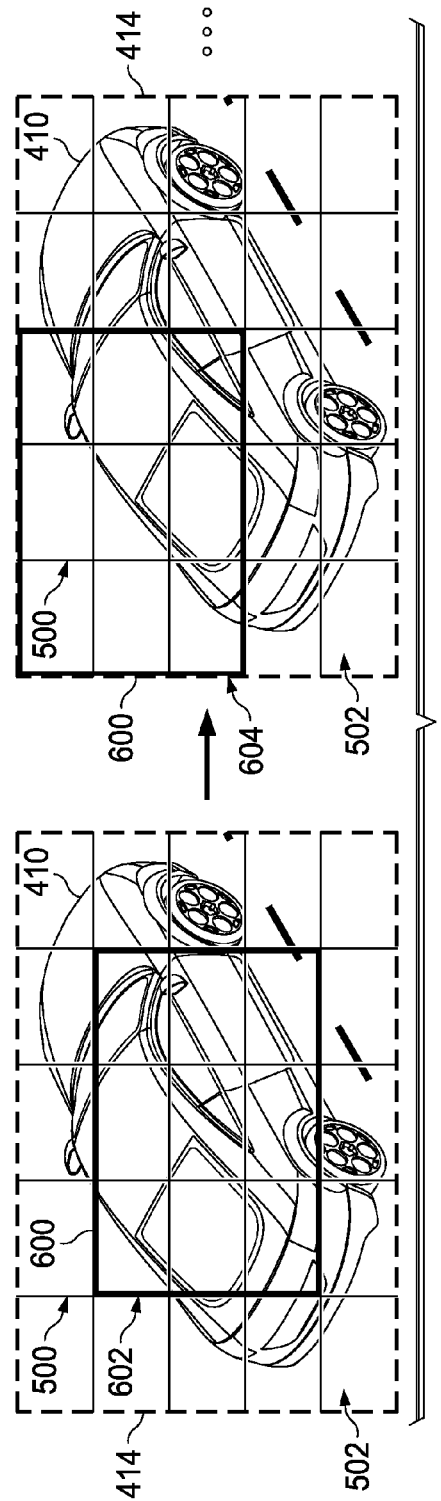

METHOD AND APPARATUS FOR DETECTING TARGETS

BACKGROUND INFORMATION

1. Field

The present disclosure relates generally to processing images and, in particular, to processing images to detect targets of interest. Still more particularly, the present disclosure relates to a method and apparatus for detecting a target of interest using a double verification process.

2. Background

Sensor devices are oftentimes used to generate sensor data for the purpose of detecting targets of interest. Different types of sensor devices may be used to perform target detection. For example, without limitation, electro-optical (EO) sensors, infrared (IR) imaging systems, radar imaging systems, and other types of sensor devices may be used to perform target detection.

Target detection may be performed in a number of different ways. As one example, an unmanned aerial vehicle (UAV) may be used to surveil an area and detect any targets of interest that are on ground. The target of interest may be, for example, but is not limited to, a ground vehicle, a person, or some other type of target.

Some currently available methods for performing target detection are unable to detect targets with a desired level of accuracy. For example, when targets of interest are located in environments that are crowded, such as urban environments, distinguishing between the targets of interest and a background in images may be more difficult than desired. Further, some currently available methods for performing target detection in images may be unable to detect targets that are at least partially occluded with the desired level of accuracy and efficacy. Therefore, it would be desirable to have a method and apparatus that take into account at least some of the issues discussed above, as well as other possible issues.

SUMMARY

In one illustrative embodiment, a method for performing target detection is provided. A potential object is detected within a candidate chip in an image. The potential object is verified as a candidate object. The candidate object is classified as one of a candidate target or a background in response to the potential object being verified as the candidate object. The candidate target is verified as a target of interest in response to the candidate object being classified as the candidate target.

In another illustrative embodiment, a method for processing images is provided. A potential moving object is detected within a candidate chip in an image. The potential moving object is verified as a candidate object based on at least one of an appearance of the potential moving object or a direction of movement of the potential moving object. The candidate object is classified as one of a candidate target or a background in response to the potential moving object being verified as the candidate object. The candidate target is verified as a target of interest in response to the candidate object being classified as the candidate target using a number of reference target chips.

In yet another illustrative embodiment, an apparatus comprises an object detector and a classifier. The object detector detects a potential object within a candidate chip in an image. The object detector further verifies that the potential object is a candidate object. The classifier classifies the candidate object as one of a candidate target or a background in response to the potential object being verified as the candidate object. The classifier further verifies that the candidate target is a target of interest in response to the candidate object being classified as the candidate target.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of one manner of dividing a candidate chip into a grid of cells in accordance with an illustrative embodiment;

FIG. 6 is an illustration of different sub-regions in a candidate chip in accordance with an illustrative embodiment;

DETAILED DESCRIPTION

The illustrative embodiments recognize and take into account different considerations. For example, the illustrative embodiments recognize and take into account that it may be desirable to provide a method for detecting targets of interest with a desired level of accuracy. In particular, the illustrative embodiments recognize and take into account that it may be desirable to provide a method for detecting targets of interest in images with the desired level of accuracy even against busy environments and when the targets are partially occluded.

Thus, the illustrative embodiments provide a method for processing images to perform target detection and recognition. As one illustrative example, a potential object may be detected within a candidate chip in an image. The potential object is then verified as a candidate object. If the potential object does not pass this first verification, the potential object may be considered a false detection. The candidate object may be classified as one of a candidate target or a background in response to the potential object being successfully verified as the candidate object. The candidate target may then be verified as a target that is of interest in response to the candidate object being classified as the candidate target. This second verification may ensure that the classification of the candidate target has a desired level of accuracy and that the candidate target is not a background that has been misclassified.

In this manner, the illustrative embodiments provide a method for detecting targets that may be used in a number of different applications. For example, without limitation, this process may be easily and quickly performed for use in automatic ground vehicle detection from unmanned aerial vehicles. Further, this process may enable more accurate and efficient persistent target tracking and target reacquisition from unmanned aerial vehicles.

Figure 1:
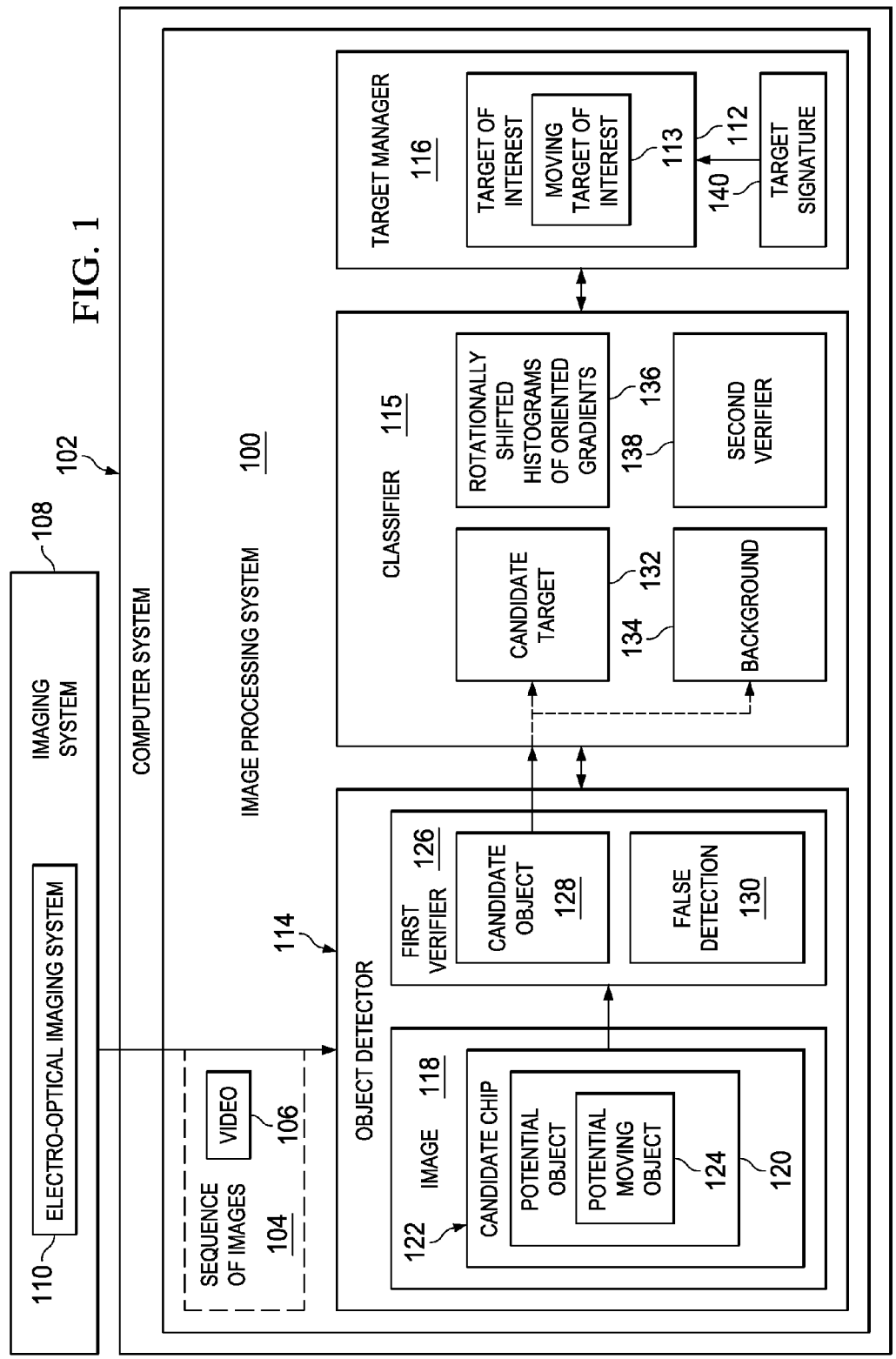
FIG. 1 is an illustration of an image processing system in the form of a block diagram in accordance with an illustrative embodiment.

Referring now to the figures and, in particular, with reference to FIG. 1, an illustration of an image processing system is depicted in the form of a block diagram in accordance with an illustrative embodiment. In this illustrative example, image processing system 100 may be implemented using software, hardware, firmware, or a combination thereof.

When software is used, the operations performed by image processing system 100 may be implemented using, for example, without limitation, program code configured to run on a processor unit. When firmware is used, the operations performed by image processing system 100 may be implemented using, for example, without limitation, program code and data and stored in persistent memory to run on a processor unit.

When hardware is employed, the hardware may include one or more circuits that operate to perform the operations performed by image processing system 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, image processing system 100 may be implemented in computer system 102. Image processing system 100 may be used to process sequence of images 104. Sequence of images 104 may be a plurality of images ordered with respect to time. Each image in each sequence of images may be a still image. In some cases, sequence of images 104 may be referred to as video 106. In these cases, each image in video 106 may be referred to as a frame.

Image processing system 100 may receive sequence of images 104 from imaging system 108. Imaging system 108 may take the form of, for example, without limitation, electro-optical (EO) imaging system 110. However, in other illustrative examples, imaging system 110 may take the form of an infrared (IR) imaging system, a radar imaging system, or some other type of imaging system.

Image processing system 100 may process sequence of images 104 to detect target of interest 112. Target of interest 112 may be, for example, without limitation, moving target of interest 113. In some cases, target of interest 112 may be identified prior to the beginning of processing sequence of images 104. In other cases, target of interest 112 may be acquired during processing of sequence of images 104.

Target of interest 112 may take a number of different forms. For example, without limitation, target of interest 112 may be a person, a type of ground vehicle, a type of aerial vehicle, a water vehicle, or some other type of object. The ground vehicle may be, for example, without limitation, a car, a truck, a tank, or some other type of ground vehicle. The aerial vehicle may be a missile, an aircraft, an unmanned aerial vehicle, or some other type of aerial vehicle. In some cases, target of interest 112 may be a specified target.

As depicted, image processing system 100 may include object detector 114, classifier 115, and target manager 116. Each of object detector 114, classifier 115, and target manager 116 may be implemented using hardware, firmware, software, or a combination thereof.

Object detector 114 may receive sequence of images 104 from imaging system 108. Image 118 may be an example of one of sequence of images 104. Object detector 114 is configured to detect potential objects in image 118. A potential object may potentially be target of interest 112.

For example, without limitation, object detector 114 may detect potential object 120 within candidate chip 122 in image 118. Object detector 114 may use a number of algorithms, techniques, or computational processors to detect potential object 120. In one illustrative example, when target of interest 112 is moving target of interest 113, potential object 120 may be potential moving object 124. In this manner, object detector 114 may also be referred to as a moving object detector.

As used herein, a chip may be a region of an image. In this manner, a candidate chip, such as candidate chip 122, may be a region of an image that captures a potential object. In other words, candidate chip 122 may be a region of image 118 that is identified as potentially capturing target of interest 112.

Once potential object 120 has been detected, this detection is verified. For example, without limitation, object detector 114 may include first verifier 126. First verifier 126 may verify that potential object is candidate object 128 and not false detection 130. If first verifier 126 determines that potential object is false detection 130, object detector 114 then proceeds with processing the next image in sequence of images 104.

If first verifier 126 successfully verifies that potential object is candidate object 128, classifier 115 may then classify candidate object 128 as one of candidate target 132 or background 134. This classification may be performed in a number of different ways. In one illustrative example, classifier 115 may use rotationally shifted histograms of oriented gradients 136 to perform this classification. Rotationally shifted histograms of oriented gradients 136 may also be referred to as rotationally shifting histograms of oriented gradients, circularly shifting histograms of oriented gradients, or circularly shifted histograms of oriented gradients.

Of course, in other illustrative examples, other types of classification methods may be used. For example, at least one of a target recognition method, an edge detection method, a chrominance pattern comparison method, a shape comparison method, a linearly constrained minimum variance (LCMV) method, a correlation matrix method, or some other type of method may be used.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

If candidate object 128 is classified as background 134, then target of interest 112 has not been detected. However, if candidate object 128 is classified as candidate target 132, then a second verification may be performed.

In this illustrative example, classifier 115 may include second verifier 138. Second verifier 138 may verify that candidate target 132 is indeed target of interest 112. If second verifier 138 is unable to successfully verify that candidate target 132 is target of interest 112, then candidate target 132 is designated as background 134.

However, if second verifier 138 does successfully verify that candidate target 132 is target of interest 112, then target manager 116 may be used to generate target signature 140 for target of interest 112 based on candidate chip 122. Target signature 140 includes information that may be used to track target of interest 112 in a set of subsequent images in sequence of images 104.

Target signature 140 may include, for example, without limitation, a fingerprint vector and covariance matrix for target of interest 112, computed with respect to candidate chip 122. The fingerprint vector may be generated, for example, without limitation, with respect to a color space, such as, but not limited to, a chroma-based color space.

In this manner, the fingerprint vector may provide chromaticity information. The chromaticity information may include, for example, without limitation, a luminance mean value, a red chrominance mean value, a blue chrominance mean value, luminance entropy, red chrominance entropy, and blue chrominance entropy. In some cases, target signature 140 for target of interest 112 may also include shape information, location information, orientation information, or some combination thereof for use in tracking target of interest 112.

Figure 2:
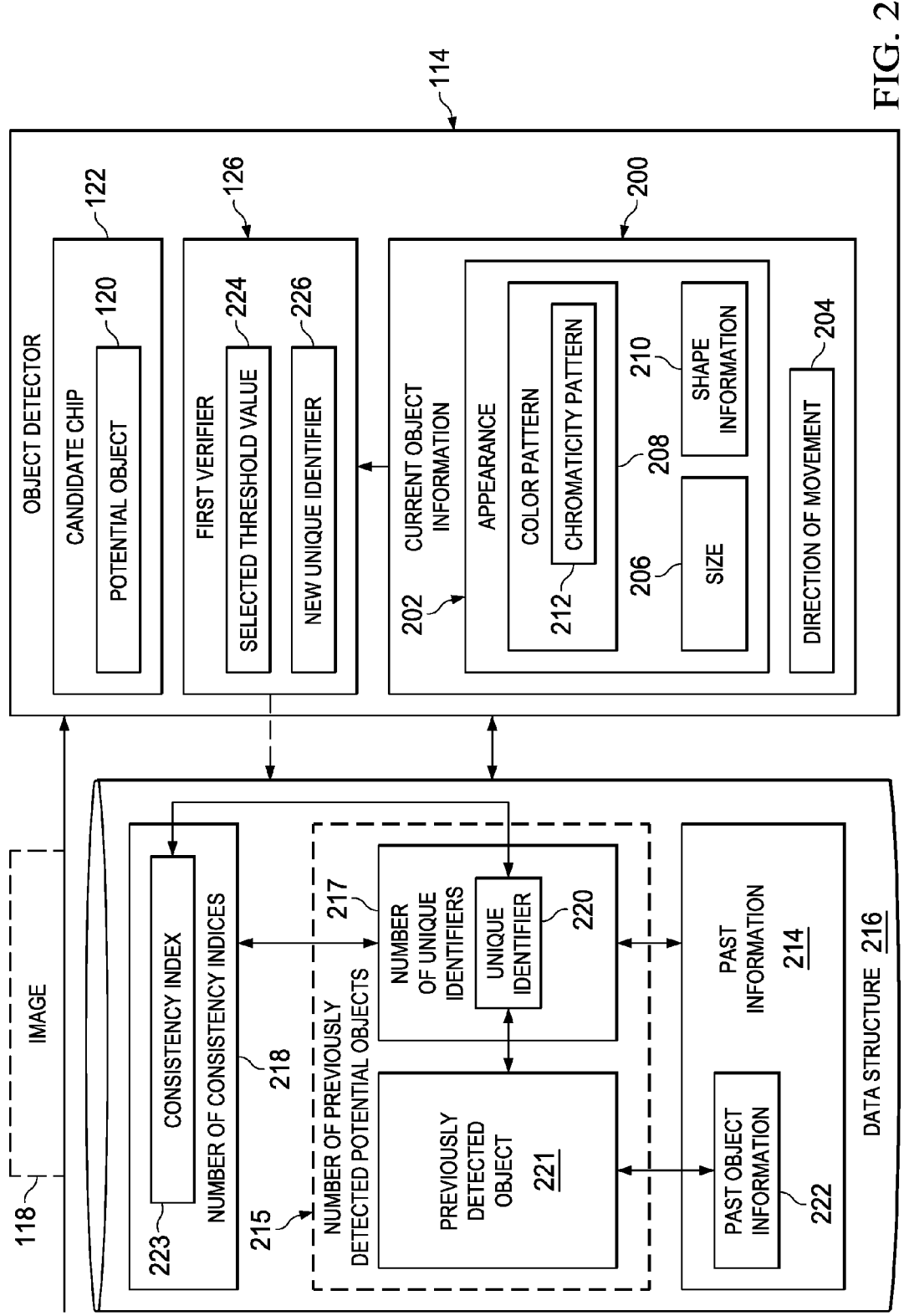
FIG. 2 is an illustration of an object detector in greater detail in the form of a block diagram in accordance with an illustrative embodiment.

With reference now to FIG. 2, an illustration of object detector 114 from FIG. 1 is depicted in greater detail in the form of a block diagram in accordance with an illustrative embodiment. When object detector 114 detects potential object 120 within candidate chip 122 in image 118, object detector 114 may also identify current object information 200 for potential object 120.

Current object information 200 may include at least one of appearance 202, direction of movement 204, or some other type of information. In one illustrative example, direction of movement 204 may comprise an orientation of potential object 120 with respect to a reference coordinate system. This reference coordinate system may be used for sequence of images 104. In some cases, direction of movement 204 may also comprise a position of potential object 120 with respect to the reference coordinate system.

Object detector 114 identifies appearance 202 of potential object 200 using at least one of size 206, color pattern 208, shape information 210, or some other type of information about potential object 120. Size 206 may be, for example, without limitation, based on the number of pixels in image 118 that represent potential object 120, a number of dimensions for potential object 120, or some other measure of size.

Color pattern 208 may provide information about the pixel values of pixels detected as representing potential object 120 with respect to one or more selected color spaces. In one illustrative example, color pattern 208 takes the form of chrominance pattern 212, which corresponds to a chroma-based color space. Shape information 210 may include, for example, without limitation, at least one of information about the overall shape of potential object 120, information about the edges of potential object 120, or some other type of information.

First verifier 126 uses current object information 200 to verify that potential object 120 is candidate object 128. In one illustrative example, first verifier 126 determines whether potential object 120 matches a previously detected potential object in at least one previous image of sequence of images 104 that was processed by object detector 114 based on current object information 200.

For example, past information 214 about number of previously detected potential objects 215 may be stored in data structure 216. In one illustrative example, data structure 216 may comprise one or more databases. As used herein, a "number of" items may include one or more items. In this manner, number of previously detected potential objects 215 may include one or more previously detected potential objects. Of course, at the beginning of processing sequence of images 104 in FIG. 1, no previously detected potential objects may exist.

Number of unique identifiers 217 and number of consistency indices 218 may be stored in data structure 216. Each of number of unique identifiers 217 may correspond to one of number of previously detected potential objects 215 that is being tracked through one or more images of sequence of images 104 in FIG. 1. Past information 214 may include past object information associated with each of number of unique identifiers 217.

Further, a consistency index in number of consistency indices 218 may be, for example, without limitation, a counting index. In other words, a consistency index may be a count of the number of times that a previously detected potential object has been detected in the previously processed images of sequence of images 104.

As one illustrative example, unique identifier 220 may correspond to previously detected potential object 221 in number of previously detected potential objects 215. Past object information 222 may be the information previously generated by object detector 114 for previously detected potential object 221. First verifier 126 may compare current object information 200 to past object information 222.

If current object information 200 matches past object information 222 within selected tolerances, first verifier 126 may then update consistency index 223 corresponding to previously detected potential object 221. For example, without limitation, first verifier 126 may increase consistency index 223 by one.

First verifier 126 may then determine whether consistency index 223 has reached selected threshold value 224. Selected threshold value 224 may be selected to ensure consistency in the detection of potential objects by object detector 114. Depending on the implementation, selected threshold value 224 may be two, three, five, ten, twenty, or some other value.

If first verifier 126 has not reached selected threshold value 224, then potential object 120 is not yet considered candidate object 128. Object detector 114 may then process a next image in sequence of images 104. However, if first verifier 126 has reached selected threshold value 224, then first verifier 126 designates potential object 120 as candidate object 128. Candidate object 128 may keep unique identifier 220.

When number of previously detected potential objects 215 includes multiple previously detected potential objects, first verifier 126 may compare current object information 200 to the past object information for each previously detected potential object to identify the best matched previously detected potential object. If current object information 200 matches the past object information for this best matched previously detected potential object within selected tolerances, first verifier 126 may then update consistency index for the corresponding best matched previously detected potential object.

In other illustrative examples, when first verifier 126 determines that current object information 200 does not match the past object information associated with any of number of unique identifiers 217 for number of previously detected potential objects 215, first verifier 126 assigns new unique identifier 226 to potential object 120. First verifier 126 then stores new unique identifier 226 along with current object information 200 for potential object 120 in data structure 216 for later use.

In some cases, once potential object 120 has been designated as candidate object 128, object detector 114 may store candidate chip 122 in data structure 216 in association with the corresponding unique identifier for future use. If candidate object 128 is later determined to be target of interest 112 by classifier 115, as described in FIG. 1, candidate chip 122 may then be referred to as a target chip.

Figure 3:
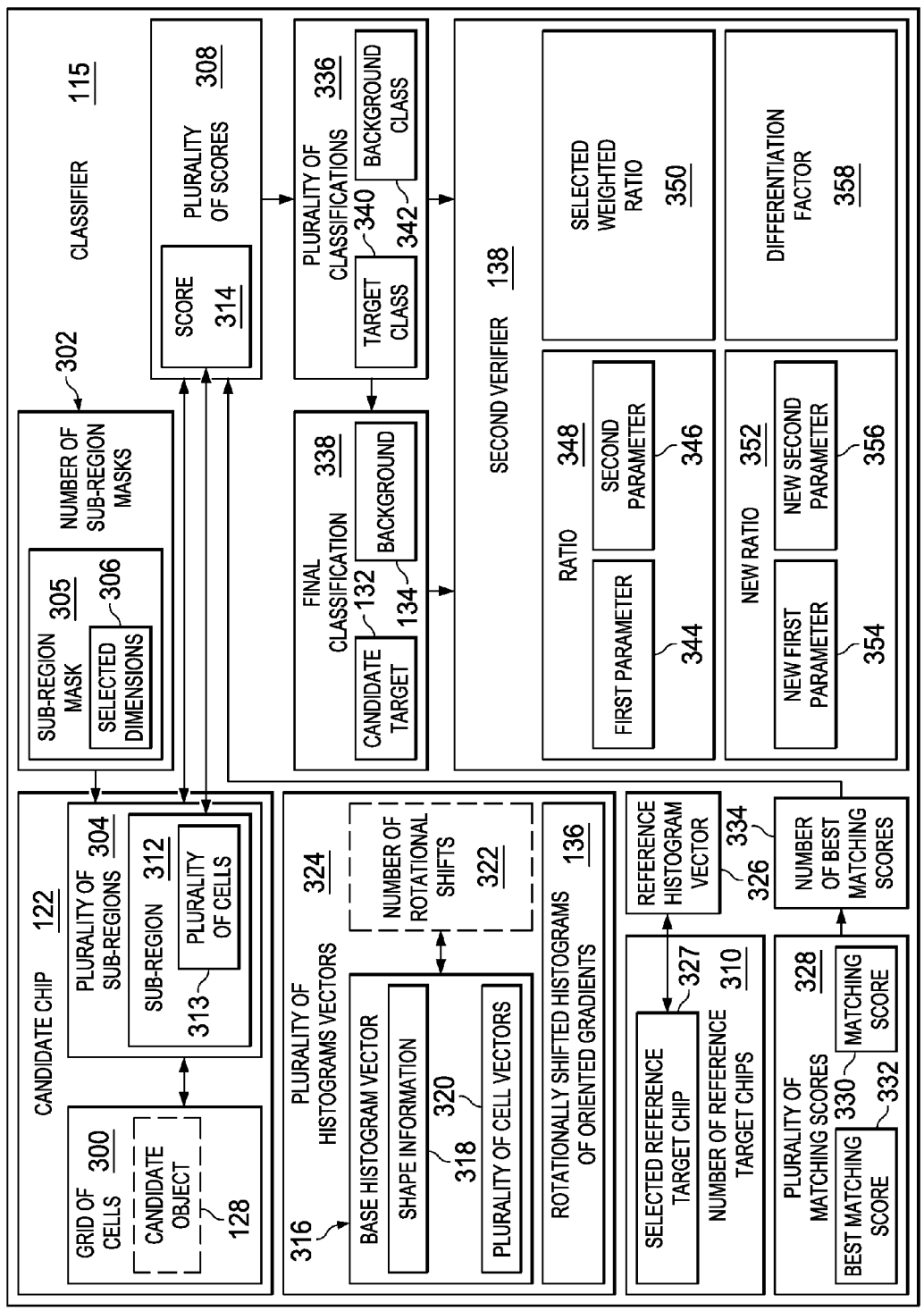
FIG. 3 is an illustration of a classifier in greater detail in the form of a block diagram in accordance with an illustrative embodiment.

With reference now to FIG. 3, an illustration of classifier 115 from FIG. 1 is depicted in greater detail in the form of a block diagram in accordance with an illustrative embodiment. Once first verifier 126 from FIGS. 1-2 has verified that potential object 120 is candidate object 128, classifier 115 may then classify candidate object 128.

Classifier 115 classifies candidate object 128 as candidate target 132 or background 134. This classification may be performed in different ways using different types of classification techniques and algorithms.

In one illustrative example, classifier 115 may use rotationally shifted histograms of oriented gradients 136. For example, without limitation, classifier 115 may divide candidate chip 122 into grid of cells 300. Grid of cells 300 may be a grid of multiple rows and multiple columns. Classifier 115 may then use number of sub-region masks 302 to identify plurality of sub-regions 304.

Each of number of sub-region masks 302 may have different dimensions. As one illustrative example, number of sub-region masks 302 may include sub-region mask 305 having selected dimensions 306. Selected dimensions 306 may include, for example, without limitation, a row dimension and a column dimension. Selected dimensions 306 may be selected such that sub-region mask 305 is smaller than candidate chip 122. For example, without limitation, if grid of cells 300 for candidate chip 122 is a 5 by 5 grid, then sub-region mask 305 may have selected dimensions 306 of 3 by 3 or 4 by 4.

Classifier 115 may compute plurality of scores 308 for plurality of sub-regions 304. In particular, classifier 115 may use rotationally shifted histograms of oriented gradients 136 and number of reference target chips 310 stored in data structure 216 in FIG. 2 to compute a score for each of plurality of sub-regions 304.

In these illustrative examples, a reference target chip in number of reference target chips 310 may be an image or a portion of that image that is known to capture target of interest 112 in FIG. 1. This image may be independent of sequence of images 104 in FIG. 1. For example, the reference target chip may be a stock picture of a ground vehicle of interest. In other illustrative examples, a reference target chip in number of reference target chips 310 may take the form of a region of a previous image in sequence of images 104 within which a potential object was detected, verified as a candidate object, classified as a candidate target, and then verified as target of interest 112.

Sub-region 312 may be an example of one of plurality of sub-regions 304. Sub-region 312 may include plurality of cells 313. Classifier 115 generates score 314 for sub-region 312 based on sub-region 312 and number of reference target chips 310 stored in data structure 216.

As one illustrative example, classifier 115 identifies base histogram vector 316 for sub-region 312. Base histogram vector 316 may be computed using the method of computing histograms of oriented gradients (HoG).

In particular, base histogram vector 316 is a feature descriptor. This feature descriptor may be generated by computing a histogram of oriented gradients for each cell in plurality of cells 313 of sub-region 312 and discretizing the histogram for each cell into bins to ultimately form a vector of cells in which each cell comprises a vector of bins. Base histogram vector 316 may capture shape information 318 for candidate object 128 within sub-region 312 by capturing information about the gradients. Each bin within the vector of bins for a particular cell of plurality of cells 313 captures the proportional contribution of each pixel in that cell to the gradient magnitude at that pixel.

For example, without limitation, base histogram vector 316 may include plurality of cell vectors 320. As one illustrative example, base histogram vector 316 may include M cells, each of which corresponds to one of plurality of cells 313 of sub-region 312. Each of the M cells may have N rotational steps. In this manner, each of the M cells may be considered a cell vector.

Number of rotational shifts 322 may be applied to plurality of cells 313 in sub-region 312 to generate rotationally shifted versions of base histogram vector 316. Together, these rotationally shifted histogram vectors and base histogram vector 316 form plurality of histogram vectors 324. As one illustrative example, when sub-region 312 comprises 9 cells that form a 3 by 3 grid, sub-region 312 may be rotated 8 times. As another illustrative example, when sub-region 312 comprises 16 cells that form a 4 by 4 grid, sub-region 312 may be rotated 12 times. In this manner, plurality of histogram vectors 324 may be formed by rotationally shifted histograms of oriented gradients 136.

Classifier 115 may then compare each of plurality of histogram vectors 324 to reference histogram vector 326 for selected reference target chip 327 in number of reference target chips 310 to generate plurality of matching scores 328. For example, matching score 330 in plurality of matching scores 328 may be a measure of the likeness or a degree of matching between reference histogram vector 326 and a corresponding histogram vector of plurality of histogram vectors 324.

In this illustrative example, classifier 115 may select best matching score 332 from plurality of matching scores 328. In one illustrative example, the best matching score may be the minimum score of plurality of matching scores 328. The process of generating best matching score 332 for sub-region 312 may be repeated using the corresponding reference histogram vector for each of number of reference target chips 310 to form number of best matching scores 334 for sub-region 312. The best score of number of best matching scores 334 may be assigned as score 314 for sub-region 312. In one illustrative example, the best score may be the minimum score of number of best matching scores 334.

The process of generating score 314 for sub-region 312 may be repeated for each of plurality of sub-regions 304 to generate plurality of scores 308 for plurality of sub-regions 304. Each sub-region of plurality of sub-regions 304 may then be classified as either "target" or "background" based on the corresponding score of that sub-region.

As one illustrative example, sub-region 312 may be classified as "target" when score 314 for sub-region 312 meets a selected requirement and may be classified as "background" when score 314 does not meet the selected requirement. The selected requirement may be, for example, that score 314 be below a maximum threshold. Of course, in other illustrative examples, depending on the type of scoring used, the selected requirement may be that score 314 be above a minimum threshold. In this manner, plurality of classifications 336 may be generated for plurality of sub-regions 304.

Plurality of classifications 336 may then be used to generate final classification 338 for candidate object 128. For example, without limitation, if at least one of plurality of classifications 336 is "target," then final classification 338 for candidate object 128 may be candidate target 132. However, if none of plurality of classifications 336 is "target," then final classification 338 for candidate object 128 may be background 134. In other words, classifier 115 may classify candidate object 128 as candidate target 132 when at least one of plurality of scores 308 meets the selected requirement, but may classify candidate object 128 as background 134 if none of plurality of scores 308 meets the selected requirement.

Second verifier 138 may then be used to verify that candidate target 132 is indeed target of interest 112 using plurality of classifications 336. The overall verification process used by second verifier 138 may be based on the K-nearest-neighbors technique.

Any and all sub-regions in plurality of sub-regions 304 having a classification of "target" may be designated as forming target class 340. Any and all sub-regions in plurality of sub-regions 304 having a classification of "background" may be designated as forming background class 342. In some cases, either target class 340 or background class 342 may be an empty class.

If background class 342 is empty, then second verifier 138 may automatically verify that candidate target 132 is indeed target of interest 112. However, if both background class 342 and target class 340 each include one or more class members, second verifier 138 may need to perform further steps.

In one illustrative example, second verifier 138 computes first parameter 344 for plurality of sub-regions 304 and second parameter 346 for plurality of sub-regions 304. First parameter 344 may be related to target class 340. In one illustrative example, first parameter 344 and second parameter 346 may be the size of target class 340 and background class 342, respectively. As used herein, a size of a class may be the number of class members in that class.

Second verifier 138 then computes ratio 348 of first parameter 344 to second parameter 346. Second verifier 138 may determine whether ratio 348 is at least selected weighted ratio 350. In other words, second verifier 138 determines whether ratio 348 is equal to or greater than selected weighted ratio 350. Selected weighted ratio 350 may be selected to improve the accuracy of detecting target of interest 112 and reduce the number of false detections of target of interest 112.

Selected weighted ratio 350 may be weighted because this weighting provides an improved capability of correcting a wrong background detection to a correct target detection than correcting a wrong target detection to a correct background detection. This improved capability may be needed more for correcting a wrong background detection to a correct target detection because a candidate chip that contains background, but that is mistakenly classified as containing target of interest 112, may be later disregarded in subsequent processing of images by object detector 114 described in FIGS. 1-2.

In one illustrative example, selected weighted ratio 350 may be set based on a training process using reference target chips and reference background chips. In another illustrative example, selected weighted ratio 350 may be set to be between about two-thirds and one such that more weight may be applied to detect targets. For example, if ratio 348 is equal to or greater than selected weighted ratio 350, second verifier 138 successfully verifies that candidate target 132 is indeed target of interest 112.

If ratio 348 is less than selected weighted ratio 350, second verifier 138 may then compute new ratio 354 because the difference in the sizes of the two classes may not be sufficiently distinguishing. New ratio 354 may be a ratio of new first parameter 354 to second new parameter 356.

In one illustrative example, new first parameter 354 may be a mean of the one or more scores corresponding to the sub-regions that fall within target class 340. In this illustrative example, new second parameter 356 may be the mean of the one or more scores corresponding to the sub-regions that fall within background class 342.

Second verifier 138 compares new ratio 352 to differentiation factor 358. Differentiation factor 358 is used to ensure that there is sufficient differentiation between the scores of the sub-regions that fall in target class 340 and the scores of the sub-regions that fall in background class 342.

Differentiation factor 358 may also be weighted such that more weight may be applied to detect targets. If new ratio 352 is equal to or less than differentiation factor 358, second verifier 138 successfully verifies that candidate target 132 is target of interest 112. However, if new ratio 352 is greater than differentiation factor 358, second verifier 138 may remove candidate target 132 from consideration as target of interest 112 and may reclassify candidate target 132 as background 134.

In this manner, the first verification process formed by object detector 114 and the second verification process formed by classifier 115 may form a double verification process that improves the accuracy of target detection. In this manner, the accuracy of target tracking may also be improved.

The illustrations of image processing system 100 in FIG. 1, object detector 114 in FIGS. 1-2, and classifier 115 in FIGS. 1 and 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
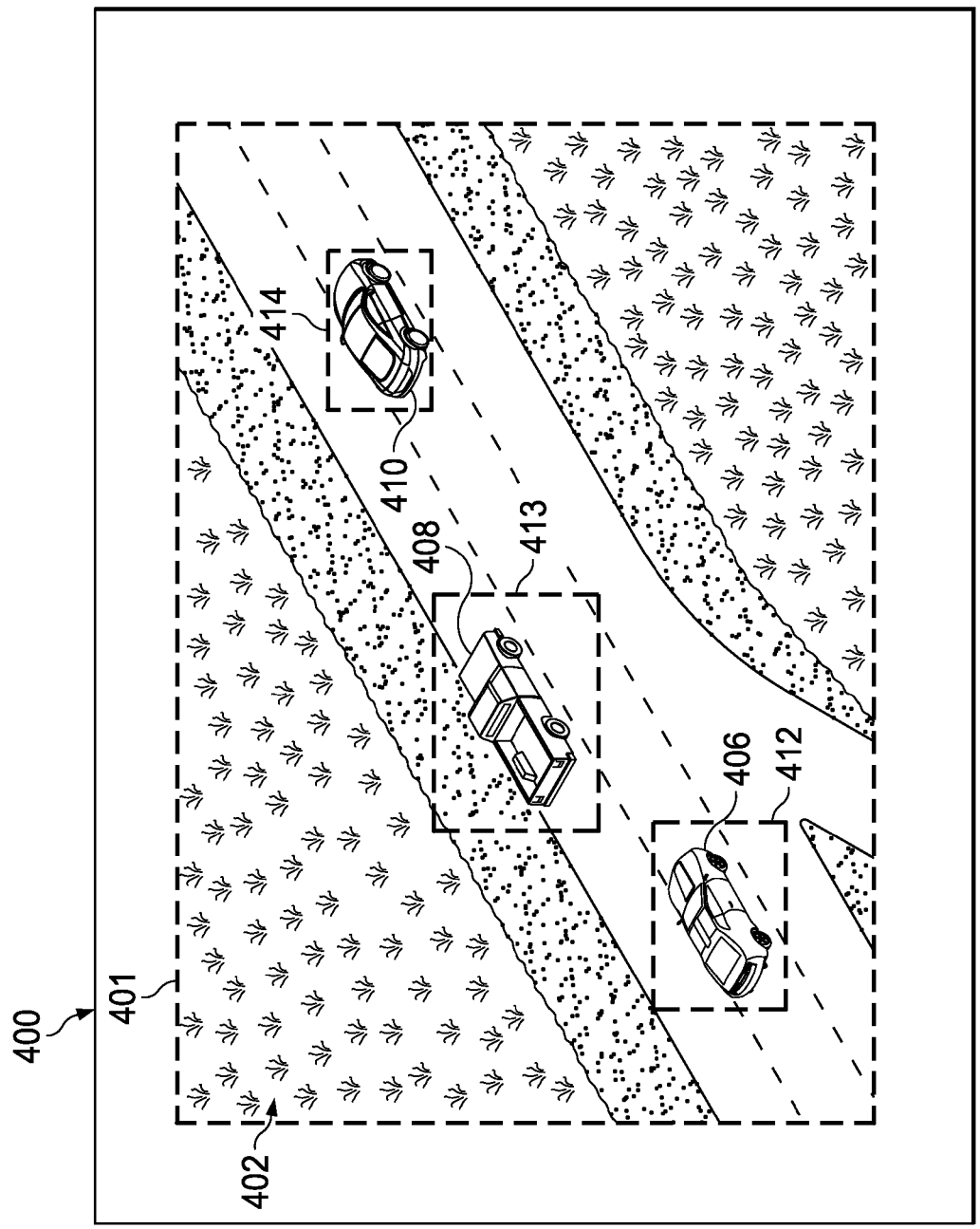
FIG. 4 is an illustration of potential objects that have been detected in an image in accordance with an illustrative embodiment.

With reference now to FIG. 4, an illustration of potential objects that have been detected in an image is depicted in accordance with an illustrative embodiment. In this illustrative example, image 400 is an example of one implementation for image 118 in FIG. 1. Image 400 may take the form of electro-optical image 401 in this illustrative example.

Image 400 captures background 402, potential object 406, potential object 408, and potential object 410. In this illustrative example, potential object 406, potential object 408, and potential object 410 are detected within candidate chip 412, candidate chip 413, and candidate chip 414, respectively. Each of potential object 406, potential object 408, and potential object 410 may be an example of one implementation for potential object 120 described in FIGS. 1-2. Further, each of candidate chip 412, candidate chip 413, and candidate chip 414 may be an example of one implementation for candidate chip 122 described in FIGS. 1-2.

With reference now to FIG. 5, an illustration of one manner of dividing candidate chip 414 from FIG. 4 into a grid of cells is depicted in accordance with an illustrative embodiment. As depicted, candidate chip 414 may be divided into grid 500 comprising cells 502. Grid 500 may be a 5 by 5 grid in this illustrative example. Further, cells 502 include 25 cells in this example.

With reference now to FIG. 6, an illustration of different sub-regions in candidate chip 414 from FIGS. 4-5 is depicted in accordance with an illustrative embodiment. As depicted, sub-region mask 600 has been positioned over a portion of candidate chip 414 to identify sub-region 602.

Sub-region mask 600 may be an example of one implementation for sub-region mask 305 in FIG. 3. As depicted, sub-region mask 600 may be a 3 by 3 grid, comprising 9 cells. Sub-region mask 600 may be moved to a different location over candidate chip 414 to identify another sub-region, such as sub-region 604.

Sub-region mask 600 may be moved to other locations to identify other sub-regions within candidate chip 414. Based on the size of sub-region mask 600, a portion of each of the sub-regions identified for candidate chip 414 may overlap with some portion of at least one other sub-region.

Figure 7:
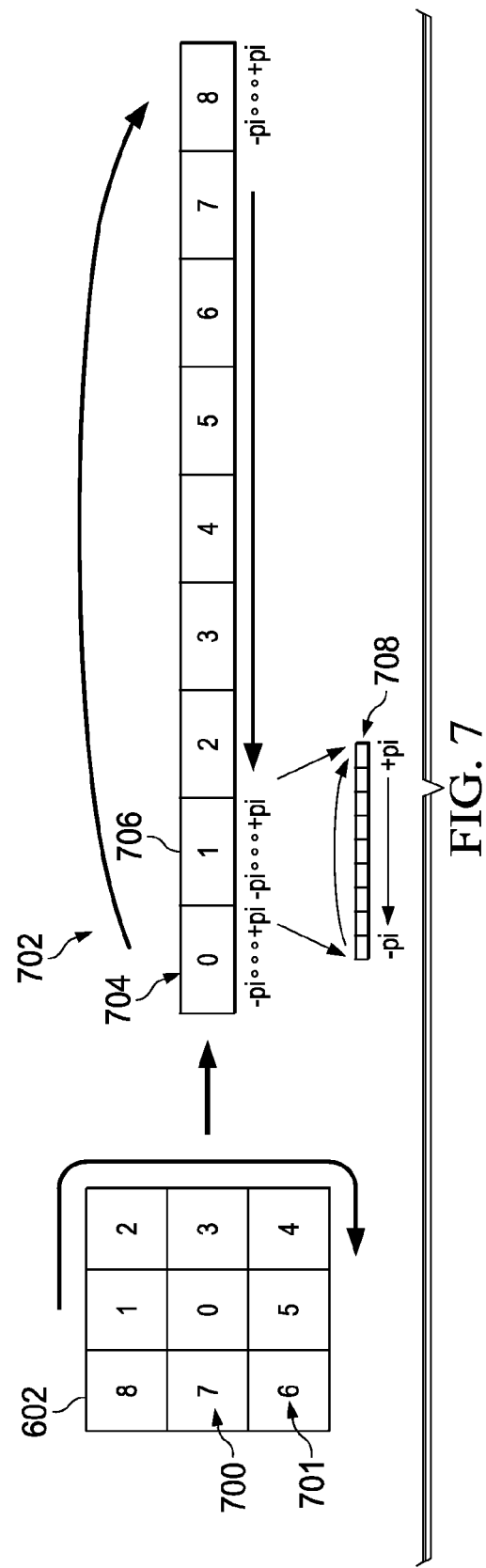
FIG. 7 is an illustration of a sub-region in accordance with an illustrative embodiment.

With reference now to FIG. 7, an illustration of sub-region 602 from FIG. 6 is depicted in accordance with an illustrative embodiment. In this illustrative example, cells 700 have been assigned corresponding index numbers 701.

Base histogram vector 702 may be generated for sub-region 602. Base histogram vector 702 may be an example of one implementation for base histogram vector 316 in FIG. 3. As depicted, base histogram vector 702 may comprise plurality of cell vectors 704.

Cell vector 706 may be an example of one of plurality of cell vectors 704. Cell vector 706 may include plurality of bins 708. Plurality of bins 708 may represent a histogram of oriented gradients that has been discretized.

The illustrations in FIGS. 4-7 are not meant to imply physical or architectural limitations to the manner in which an illustrative embodiment may be implemented. In particular, the different items shown in FIGS. 4-7 may be illustrative examples of how items shown in block form in FIG. 1-3 can be implemented.

Figure 8:
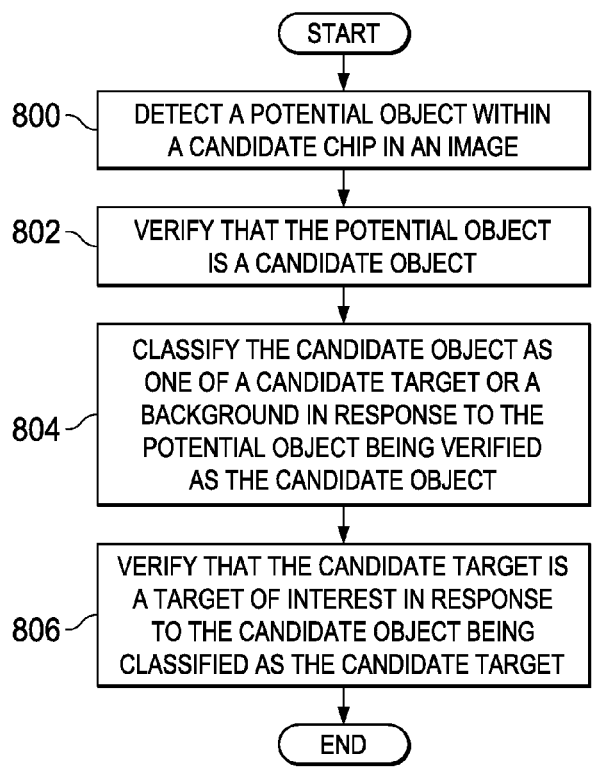
FIG. 8 is an illustration of a process for performing target detection in the form of a flowchart in accordance with an illustrative embodiment.

With reference now to FIG. 8, an illustration of a process for performing target detection is depicted in the form of a flowchart in accordance with an illustrative embodiment. The process illustrated in FIG. 8 may be implemented using image processing system 100 and the different components of image processing system 100 described in FIGS. 1-3.

The process may begin by detecting a potential object within a candidate chip in an image (operation 800). Next, the process may verify that the potential object is a candidate object (operation 802).

The candidate object may be classified as one of a candidate target or a background in response to the potential object being verified as the candidate object (operation 804). The process may verify that the candidate target is a target of interest in response to the candidate object being classified as the candidate target (operation 806), with the process terminating thereafter.

Figure 9:
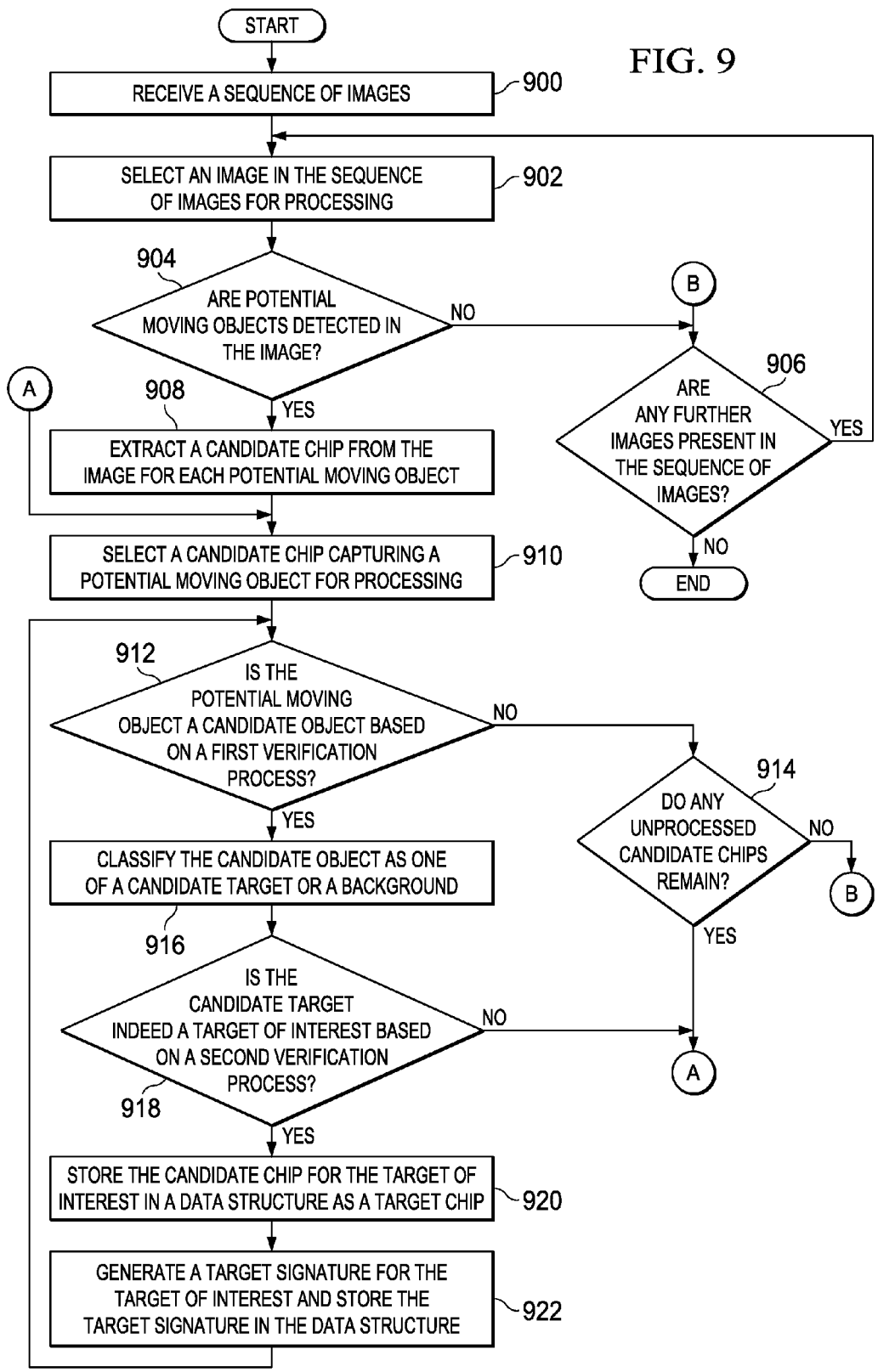
FIG. 9 is an illustration of a process for performing target detection in the form of a flowchart in accordance with an illustrative embodiment.

With reference now to FIG. 9, an illustration of a process for performing target detection is depicted in the form of a flowchart in accordance with an illustrative embodiment. The process illustrated in FIG. 9 may be implemented using image processing system 100 and the different components of image processing system 100 described in FIGS. 1-3.

The process may begin by receiving a sequence of images (operation 900). An image in the sequence of images may be selected for processing (operation 902). The first time that operation 902 is performed, the image selected may be the initial image of the sequence of images with respect to time.

The image may be processed to determine whether any potential moving objects are detected in the image (operation 904). If no potential moving objects are detected in the image, a determination may be made as to whether any further images are present in the sequence of images (operation 906). If no further images are present, the process terminates. Otherwise, the process returns to operation 902, as described above, such that a next image in the sequence of images is selected for processing.

With reference again to operation 904, if any potential moving objects are detected, a candidate chip is extracted from the image for each potential moving object (operation 908). A candidate chip capturing a potential moving object is then selected for processing (operation 910). A determination may be made as to whether the potential moving object is a candidate object based on a first verification process (operation 912). If the potential moving object is not a candidate object, the process makes a determination as to whether any unprocessed candidate chips remain (operation 914). If no unprocessed candidate chips remain, the process proceeds to operation 906 as described above. Otherwise, the process returns to operation 910 described above.

With reference again to operation 912, if the potential moving object is verified as a candidate object, the candidate object is classified as one of a candidate target or a background (operation 916). A determination may then be made as to whether the candidate target is indeed a target of interest based on a second verification process (operation 918).

If the candidate target is not a target of interest, the process returns to operation 910 described above. However, if the candidate target is indeed a target of interest, the candidate chip for the target of interest is stored in a data structure as a target chip (operation 920). Thereafter, a target signature is generated for the target of interest and stored in the data structure (operation 922), with the process then returning to operation 912 described above.

Figure 10:
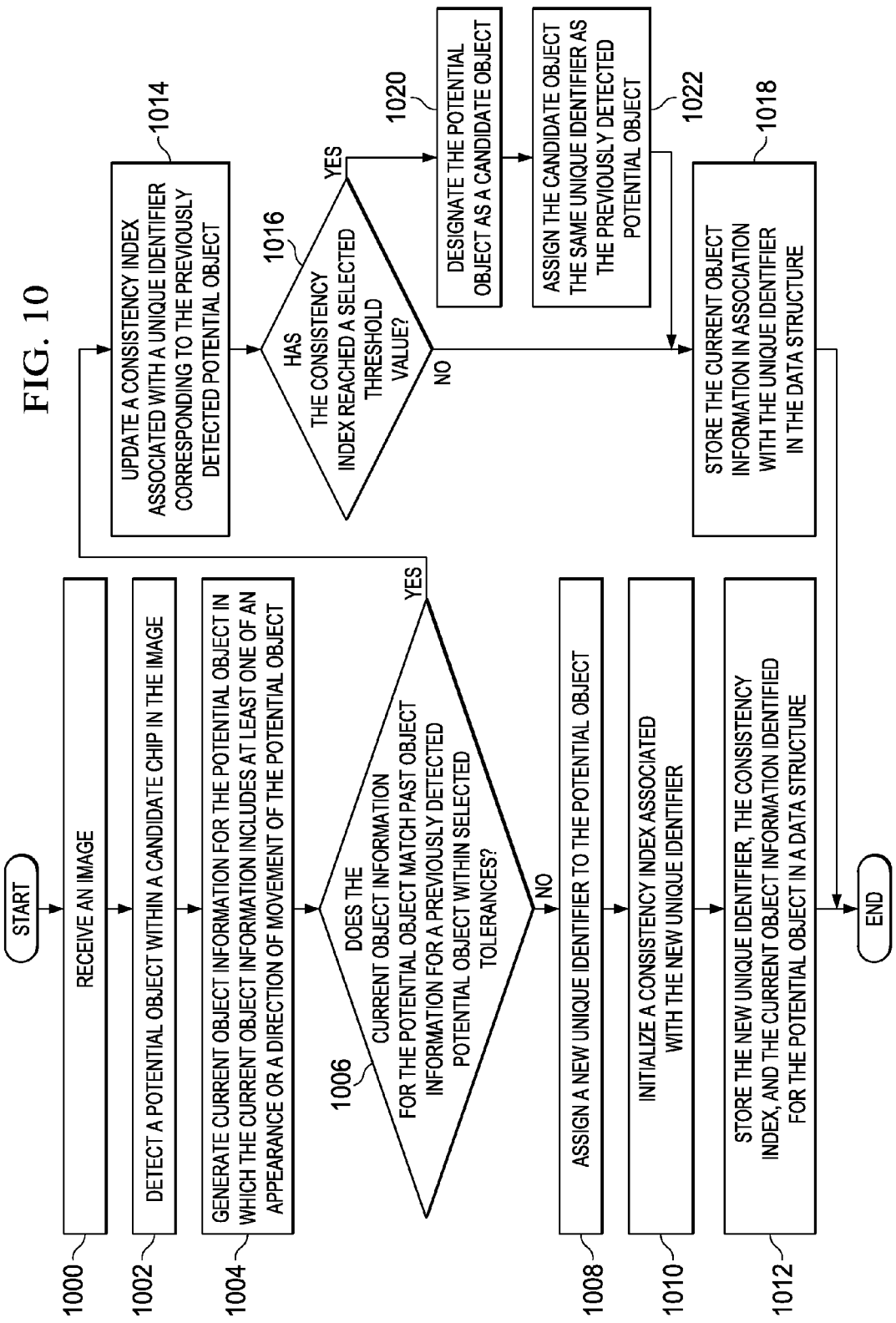
FIG. 10 is an illustration of a process for detecting a potential object and verifying the potential object as a candidate object in the form of a flowchart in accordance with an illustrative embodiment.

With reference now to FIG. 10, an illustration of a process for detecting a potential object and verifying the potential object as a candidate object is depicted in the form of a flowchart in accordance with an illustrative embodiment. The process illustrated in FIG. 10 may be implemented using image processing system 100 in FIG. 1. In particular, this process may be implemented using object detector 114 described in FIGS. 1-2.

The process may begin receiving an image (operation 1000). Next, a potential object is detected within a candidate chip in the image (operation 1002). Current object information is generated for the potential object in which the current object information includes at least one of an appearance or a direction of movement of the potential object (operation 1004).

A determination may be made as to whether the current object information for the potential object matches past object information for a previously detected potential object within selected tolerances (operation 1006). If the current object information for the potential object does not match past object information for any previously detected potential object within selected tolerances, a new unique identifier is assigned to the potential object (operation 1008).

A consistency index associated with the new unique identifier is then initialized (operation 1010). The new unique identifier, the consistency index, and the current object information identified for the potential object are stored in a data structure (operation 1012), with the process then terminating.

With reference again to operation 1006, if the current object information for the potential object does match past object information for a previously detected potential object within selected tolerances, a consistency index associated with a unique identifier corresponding to the previously detected potential object is updated (operation 1014). In one illustrative example, the consistency index is increased by one in operation 1014.

Thereafter, a determination may be made as to whether the consistency index has reached a selected threshold value (operation 1016). If the consistency index has not reached the selected threshold value, the current object information is stored in association with the unique identifier in the data structure (operation 1018), with the process then terminating. However, if the consistency index has reached the selected threshold value, the potential object is designated a candidate object (operation 1020). The candidate object is assigned the same unique identifier as the previously detected potential object (operation 1022), with the process then proceeding to operation 1018 as described above.

This process may be repeated for each image in a sequence of images that is received. Further, the process of verifying the potential object may be repeated for each potential object detected in each image.

Figure 11:
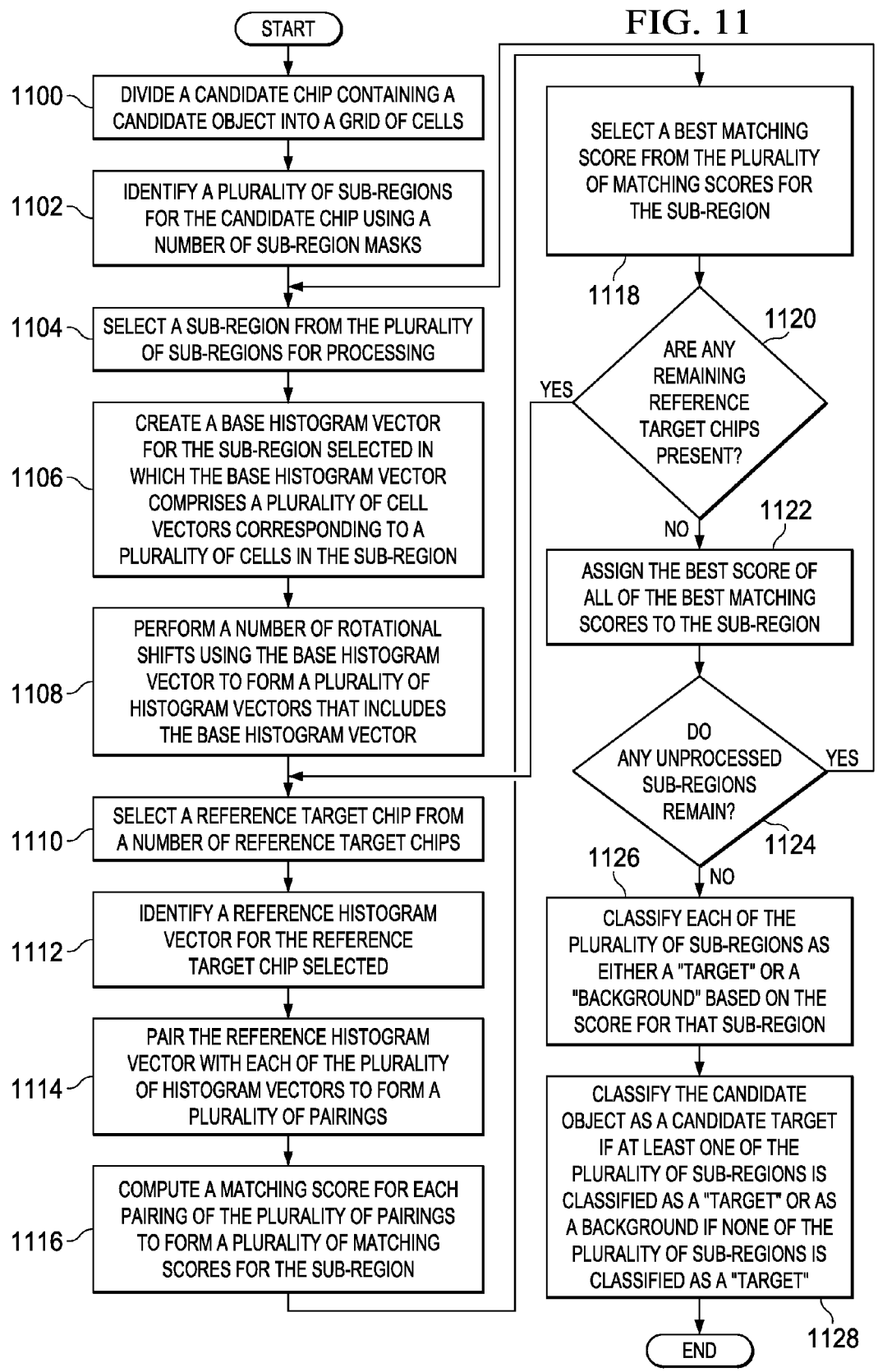
FIG. 11 is an illustration of a process for classifying a candidate object as a candidate target or a background in the form of a flowchart in accordance with an illustrative embodiment.

With reference now to FIG. 11, an illustration of a process for classifying a candidate object as a candidate target or a background is depicted in the form of a flowchart in accordance with an illustrative embodiment. The process illustrated in FIG. 11 may be implemented using image processing system 100 in FIG. 1. In particular, this process may be implemented using classifier 115 described in FIGS. 1 and 3.

The process may begin by dividing a candidate chip containing a candidate object into a grid of cells (operation 1100). A plurality of sub-regions may be identified for the candidate chip using a number of sub-region masks (operation 1102). A sub-region may then be selected from the plurality of sub-regions for processing (operation 1104).

Thereafter, a base histogram vector is created for the sub-region selected in which the base histogram vector comprises a plurality of cell vectors corresponding to a plurality of cells in the sub-region (operation 1106). A number of rotational shifts are performed using the base histogram vector to form a plurality of histogram vectors that includes the base histogram vector (operation 1108).

Next, a reference target chip is selected from a number of reference target chips (operation 1110). A reference histogram vector is identified for the reference target chip selected (operation 1112). The reference histogram vector may be paired with each of the plurality of histogram vectors to form a plurality of pairings (operation 1114). A matching score may be computed for each pairing of the plurality of pairings to form a plurality of matching scores for the sub-region (operation 1116). In operation 1116, in one illustrative example, a matching score may be computed as follows:

$$d_{CSHOG}(T, K) = \min_r \left( \sum_{i=1}^{n} \frac{|h_T^0(i) - h_K^r(i)|^2}{h_T^0(i) + h_K^r(i)} \right)$$

where T is the target of interest and corresponds to the reference target chip; K is the candidate object and corresponds to the candidate chip, $d_{CSHOG}(T,K)$ is the matching score, $h_T^0(i)$ is the $i^{th}$ element of the reference histogram vector for the selected reference target chip with no rotation, and $h_K^r(i)$ is the $i^{th}$ element of the histogram vector for the sub-region with the $r^{th}$ rotation.

A best matching score may be selected from the plurality of matching scores for the sub-region (operation 1118). In operation 1118, the best matching score selected may be an overall score for the pairing of the sub-region and the reference target chip selected. In one illustrative example, the best matching score may be the minimum value for each $r^{th}$ rotation.

A determination may then be made as to whether any remaining reference target chips are present (operation 1120). If any reference target chips remain, the process returns to operation 1110 described above. Otherwise, if no remaining reference target chips are present, the best score of all of the best matching scores is assigned to the sub-region (operation 1122). In other words, in operation 1122, the best scores become the score for the sub-region.

Next, a determination may then be made as to whether any unprocessed sub-regions remain (operation 1124). If any unprocessed sub-regions remain, the process proceeds to operation 1104 as described above. However, if no unprocessed sub-regions remain, each of the plurality of sub-regions is classified as either a "target" or a "background" based on the score for that sub-region (operation 1126).

The candidate object is classified as a candidate target if at least one of the plurality of sub-regions is classified as a "target" and as background if none of the plurality of sub-regions is classified as a "target" (operation 1128), with the process terminating thereafter. All sub-regions classified as "target" belong to a target class. All sub-regions classified as "background" belong to a background class.

Figure 12:
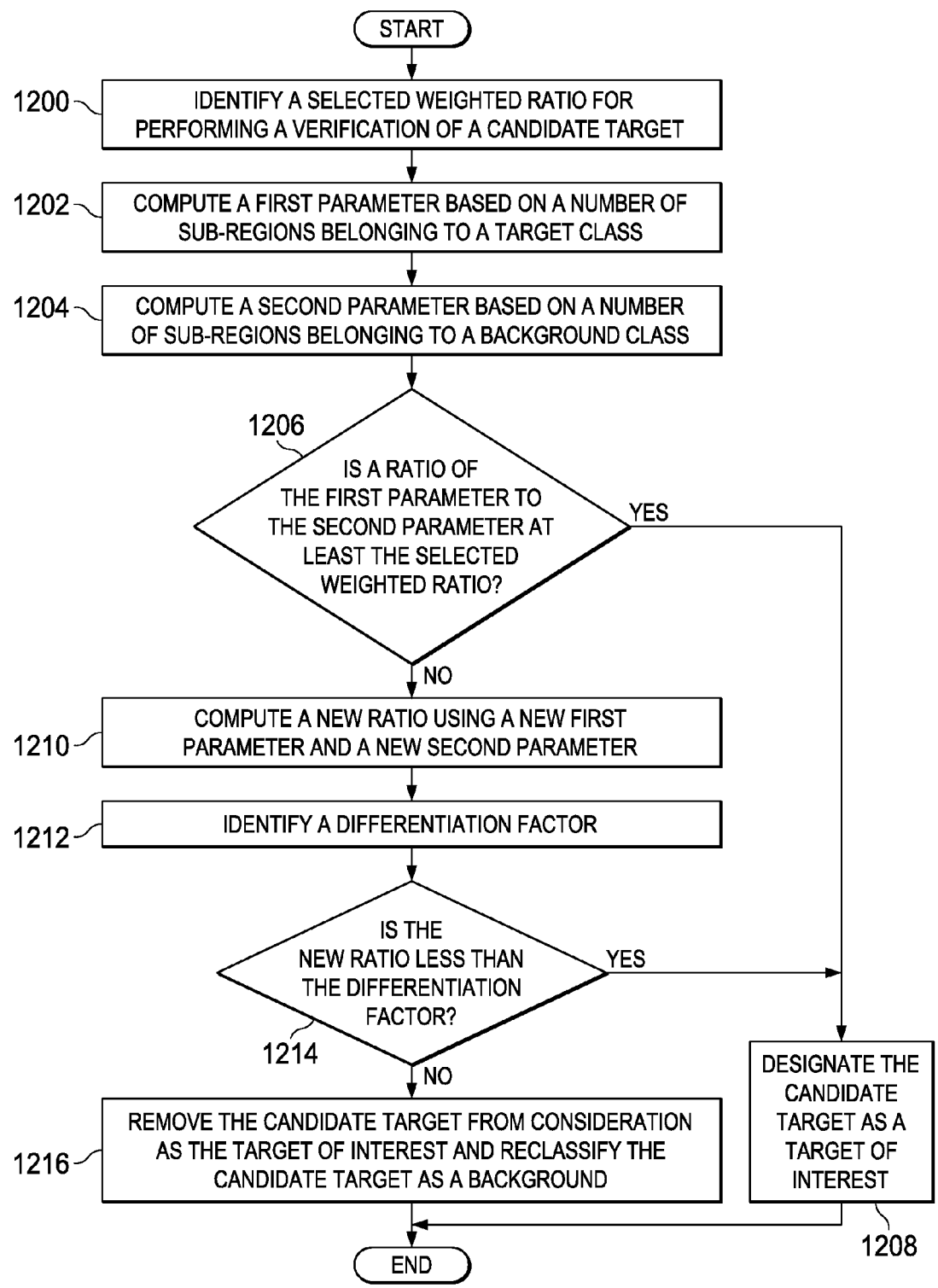
FIG. 12 is an illustration of a process for verifying that a candidate target is indeed a target of interest in the form of a flowchart in accordance with an illustrative embodiment.

With reference now to FIG. 12, an illustration of a process for verifying that a candidate target is indeed a target of interest is depicted in the form of a flowchart in accordance with an illustrative embodiment. The process illustrated in FIG. 11 may be implemented using image processing system 100 in FIG. 1. In particular, this process may be implemented using classifier 115 described in FIGS. 1 and 3.

The process may begin by identifying a selected weighted ratio for performing a verification of a candidate target (operation 1200). Next, a first parameter is computed based on a number of sub-regions belonging to a target class (operation 1202). A second parameter is computed based on the number of sub-regions belonging to a background class (operation 1204).

A determination may be made as to whether a ratio of the first parameter to the second parameter is at least the selected weighted ratio (operation 1206). If the ratio of the first parameter to the second parameter is at least the selected weighted ratio, the candidate target is designated as a target of interest (operation 1208), with the process terminating thereafter.

Otherwise, if the ratio of the first parameter to the second parameter is less than the selected weighted ratio, a new ratio is computed using a new first parameter and a new second parameter (operation 1210). In operation 1210, the new first parameter may be a mean of the scores of the number of sub-regions belonging to the target class, while the new second parameter may be a mean of the scores of the number of sub-regions belonging to the background class.

Thereafter, a differentiation factor is identified (operation 1212). A determination may be made as to whether the new ratio is less than the differentiation factor (operation 1214). If the new ratio is less than the differentiation factor, the process proceeds to operation 1208 described above. Otherwise, the candidate target is removed from consideration as the target of interest and reclassified as a background (operation 1216), with the process terminating thereafter.

Figure 13:
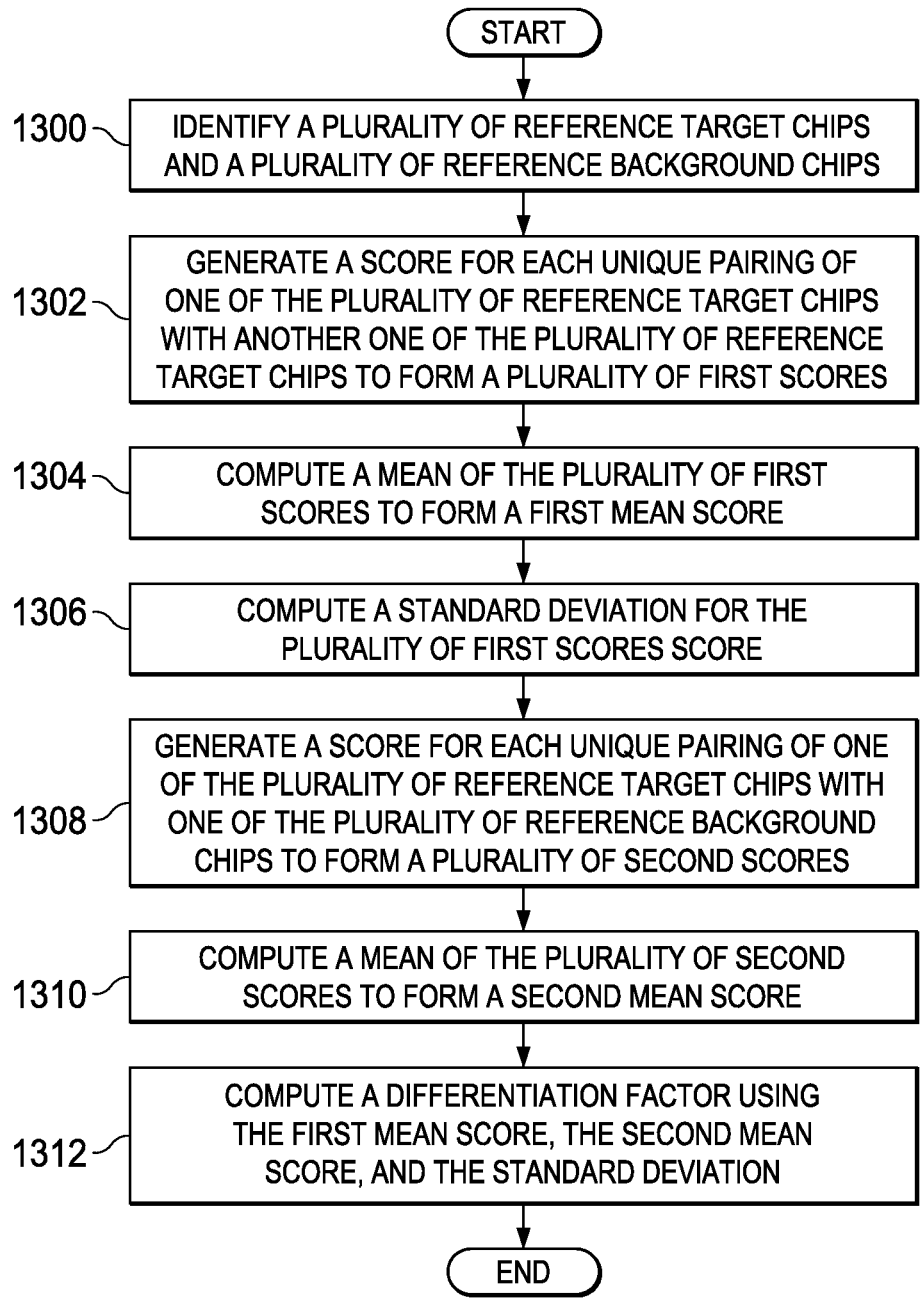
FIG. 13 is an illustration of a process for identifying a differentiation factor for performing a verification of a candidate target in the form of a flowchart in accordance with an illustrative embodiment.

With reference now to FIG. 13, an illustration of a process for identifying a differentiation factor for performing a verification of a candidate target is depicted in the form of a flowchart in accordance with an illustrative embodiment. The process illustrated in FIG. 13 may be implemented using image processing system 100 in FIG. 1. In particular, this process may be implemented using classifier 115 described in FIGS. 1 and 3.

The process may begin by identifying a plurality of reference target chips and a plurality of reference background chips (operation 1300). A score is generated for each unique pairing of one of the plurality of reference target chips with another one of the plurality of reference target chips to form a plurality of first scores (operation 1302). A mean of the plurality of first scores is computed to form a first mean score (operation 1304). Further, a standard deviation for the plurality of first scores is computed (operation 1306).

Next, a score is generated for each unique pairing of one of the plurality of reference target chips with one of the plurality of reference background chips to form a plurality of second scores (operation 1308). A mean of the plurality of second scores is computed to form a second mean score (operation 1310). Thereafter, a differentiation factor is computed using the first mean score, the second mean score, and the standard deviation (operation 1312), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
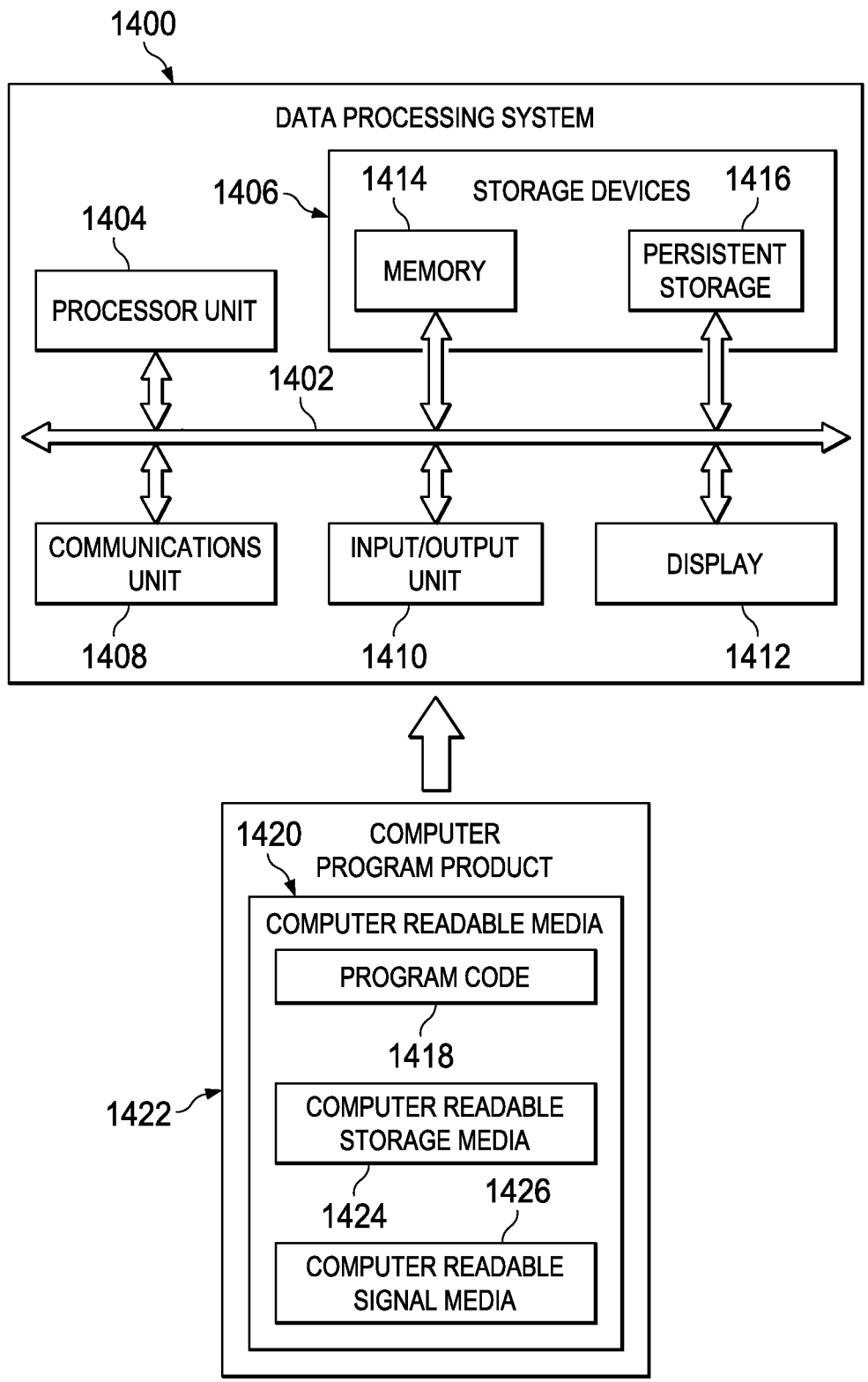
FIG. 14 is an illustration of a data processing system in the form of a block diagram in accordance with an illustrative embodiment.

Turning now to FIG. 14, an illustration of a data processing system is depicted in the form of a block diagram in accordance with an illustrative embodiment. Data processing system 1400 may be used to implement computer system 102 in FIG. 1. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise a number of processors, a multi-processor core, and/or some other type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications, and/or programs run by processor unit 1404 may be located in storage devices 1406. Storage devices 1406 may be in communication with processor unit 1404 through communications framework 1402. As used herein, a storage device, also referred to as a computer readable storage device, is any piece of hardware capable of storing information on a temporary and/or permanent basis. This information may include, but is not limited to, data, program code, and/or other information.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices. For example, persistent storage 1416 may comprise a hard drive, a flash memory, a rewritable optical disk, a rewritable magnetic tape, or some combination of the above. The media used by persistent storage 1416 may or may not be removable.

Communications unit 1408 allows data processing system 1400 to communicate with other data processing systems and/or devices. Communications unit 1408 may provide communications using physical and/or wireless communications links.

Input/output unit 1410 allows input to be received from and output to be sent to other devices connected to data processing system 1400. For example, input/output unit 1410 may allow user input to be received through a keyboard, a mouse, and/or some other type of input device. As another example, input/output unit 1410 may allow output to be sent to a printer connected to data processing system 1400.

Display 1412 is configured to display information to a user. Display 1412 may comprise, for example, without limitation, a monitor, a touch screen, a laser display, a holographic display, a virtual display device, and/or some other type of display device.

In this illustrative example, the processes of the different illustrative embodiments may be performed by processor unit 1404 using computer-implemented instructions. These instructions may be referred to as program code, computer usable program code, or computer readable program code and may be read and executed by one or more processors in processor unit 1404.

In these examples, program code 1418 is located in a functional form on computer readable media 1420, which is selectively removable, and may be loaded onto or transferred to data processing system 1400 for execution by processor unit 1404. Program code 1418 and computer readable media 1420 together form computer program product 1422. In this illustrative example, computer readable media 1420 may be computer readable storage media 1424 or computer readable signal media 1426.

Computer readable storage media 1424 is a physical or tangible storage device used to store program code 1418 rather than a medium that propagates or transmits program code 1418. Computer readable storage media 1424 may be, for example, without limitation, an optical or magnetic disk or a persistent storage device that is connected to data processing system 1400.

Alternatively, program code 1418 may be transferred to data processing system 1400 using computer readable signal media 1426. Computer readable signal media 1426 may be, for example, a propagated data signal containing program code 1418. This data signal may be an electromagnetic signal, an optical signal, and/or some other type of signal that can be transmitted over physical and/or wireless communications links.

The illustration of data processing system 1400 in FIG. 14 is not meant to provide architectural limitations to the manner in which the illustrative embodiments may be implemented. The different illustrative embodiments may be implemented in a data processing system that includes components in addition to or in place of those illustrated for data processing system 1400. Further, components shown in FIG. 14 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing target detection, the method comprising:
    detecting a potential object within a candidate chip in an image;
    verifying that the potential object is a candidate object;
    classifying the candidate object as one of a candidate target or a background in response to the potential object being verified as the candidate object; and
    verifying that the candidate target is a target of interest in response to the candidate object being classified as the candidate target, wherein verifying that the potential object is the candidate object comprises:
        determining whether the potential object matches a previously detected potential object in at least one previous image; and
        updating a consistency index associated with a unique identifier assigned to the previously detected potential object in response to a determination that the potential object matches the previously detected potential object in the at least one previous image.

2. The method of claim 1 further comprising:
    generating a target signature for the target of interest; and
    tracking the target of interest in a set of subsequent images using the target signature.

3. The method of claim 1, wherein verifying that the candidate target is the target of interest comprises:
    identifying a plurality of sub-regions for the candidate chip using a number of sub-region masks;
    generating a plurality of scores for the plurality of sub-regions; and
    assigning each of the plurality of sub-regions to one of a target class and a background class based on the plurality of scores for the plurality of sub-regions.

4. The method of claim 3, wherein verifying that the candidate target is the target of interest further comprises:
    determining whether a ratio of a first parameter computed for the target class to a second parameter computed for the background class is at least a selected weighted ratio; and
    verifying, successfully, that the candidate target is the target of interest with a desired level of accuracy in response to a determination that the ratio is at least the selected weighted ratio.

5. The method of claim 4, wherein verifying that the candidate target is the target of interest further comprises:
    computing a new ratio in response to a determination that the ratio is less than the selected weighted ratio;
    determining whether the new ratio is less than a differentiation factor;
    verifying, successfully, that the candidate target is the target of interest with a desired level of accuracy in response to a determination that the new ratio is less than the differentiation factor; and
    identifying the candidate target as the background in response to a determination that the new ratio is not less than the differentiation factor.

6. The method of claim 1, wherein verifying that the potential object is the candidate object further comprises:
    determining whether the consistency index has reached a selected threshold value; and
    identifying the potential object as the candidate object in response to a determination that the consistency index has reached the selected threshold value.

7. The method of claim 1, wherein verifying that the potential object is the candidate object further comprises:
    assigning a new unique identifier to the potential object in response to a determination that the potential object does not match any previously detected potential object.

8. The method of claim 1, wherein determining whether the potential object matches the previously detected potential object in the at least one previous image comprises:
    identifying an appearance of the potential object in the image using at least one of a size, a chrominance pattern, a color pattern, or a shape of the potential object; and determining whether the potential object matches the previously detected potential object in the at least one previous image based on the appearance of the potential object.

9. The method of claim 1, wherein determining whether the potential object matches the previously detected potential object in the at least one previous image comprises:
   identifying a direction of movement for the potential object in the previous image; and
   determining whether the potential object matches the previously detected potential object in the at least one previous image based on the direction of movement for the potential object.

10. The method of claim 1, wherein classifying the candidate object comprises:
   classifying the candidate object as one of the candidate target or the background using rotationally shifted histograms of oriented gradients in response to the potential object being verified as the candidate object.

11. The method of claim 1, wherein detecting the potential object comprises:
   detecting a potential moving object within the candidate chip in the image using a moving object detector.

12. A method for processing images, the method comprising:
   detecting a potential moving object within a candidate chip in an image;
   verifying that the potential moving object is a candidate object based on at least one of an appearance of the potential moving object or a direction of movement of the potential moving object;
   classifying the candidate object as one of a candidate target or a background in response to the potential moving object being verified as the candidate object; and
   verifying that the candidate target is a target of interest in response to the candidate object being classified as the candidate target using a number of reference target chips, wherein verifying that the candidate target is the target of interest comprises:
      identifying a plurality of sub-regions for the candidate chip using a number of sub-region masks;
      generating a plurality of scores for the plurality of sub-regions;
      assigning each of the plurality of sub-regions to one of a target class and a background class based on the plurality of scores for the plurality of sub-regions; and
      verifying that the candidate target is the target of interest using the number of reference target chips, the target class, and the background class.

13. An apparatus comprising:
   an object detector that detects a potential object within a candidate chip in an image and verifies that the potential object is a candidate object; and
   a classifier that classifies the candidate object as one of a candidate target or a background in response to the potential object being verified as the candidate object and verifies that the candidate target is a target of interest in response to the candidate object being classified as the candidate target, wherein the classifier classifies the candidate object using rotationally shifted histograms of oriented gradients.

14. The apparatus of claim 13, wherein the object detector comprises:
   a first verifier that verifies that the potential object is the candidate object based on at least one of an appearance of the potential object or a direction of movement of the potential object.

15. The apparatus of claim 14, wherein the appearance is identified using at least one of a size, a chrominance pattern, a color pattern, or a shape of the potential object.

16. The apparatus of claim 13, wherein the classifier comprises:
   a second verifier that identifies a plurality of sub-regions for the candidate chip using a number of sub-region masks, generates a plurality of scores for the plurality of sub-regions, assigns each of the plurality of sub-regions to one of a target class and a background class based on the plurality of scores for the plurality of sub-regions, and verifies that the candidate target is the target of interest using a number of reference target chips, the target class, and the background class.

17. The apparatus of claim 13, wherein the potential object is a potential moving object and wherein the target of interest is a vehicle.

* * * * *

UNITED STATES PATENT AND TRADEMARK OFFICE
CERTIFICATE OF CORRECTION

PATENT NO. : 9,715,639 B2
APPLICATION NO. : 14/743297
DATED : July 25, 2017
INVENTOR(S) : Hyukseong Kwon et al.

Page 1 of 1

It is certified that error appears in the above-identified patent and that said Letters Patent is hereby corrected as shown below:

In the Claims

Column 18, Line 42, change "a" to --the--.
Column 18, Line 43, change "a" to --the--.

Signed and Sealed this
Thirty-first Day of October, 2017

Joseph Matal
*Performing the Functions and Duties of the
Under Secretary of Commerce for Intellectual Property and
Director of the United States Patent and Trademark Office*